T. A. WESTON.
Brake-Clutch for Hoisting Apparatus.

No. 134,957.  Patented Jan. 14, 1873.

Witnesses, Harry Smith
Thomas McIlvain

T. A. Weston
By his atty.
Howson & Son

UNITED STATES PATENT OFFICE.

THOMAS A. WESTON, OF RIDGEWOOD, NEW JERSEY.

IMPROVEMENT IN BRAKE-CLUTCHES FOR HOISTING APPARATUS.

Specification forming part of Letters Patent No. 134,957, dated January 14, 1873.

*To all whom it may concern:*

Figure 1:
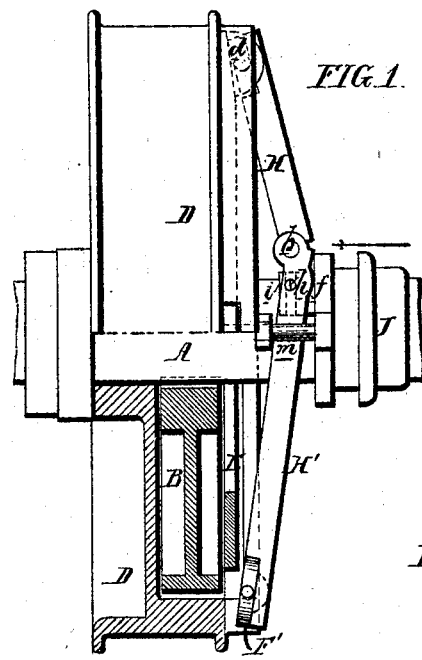
Figure 2:
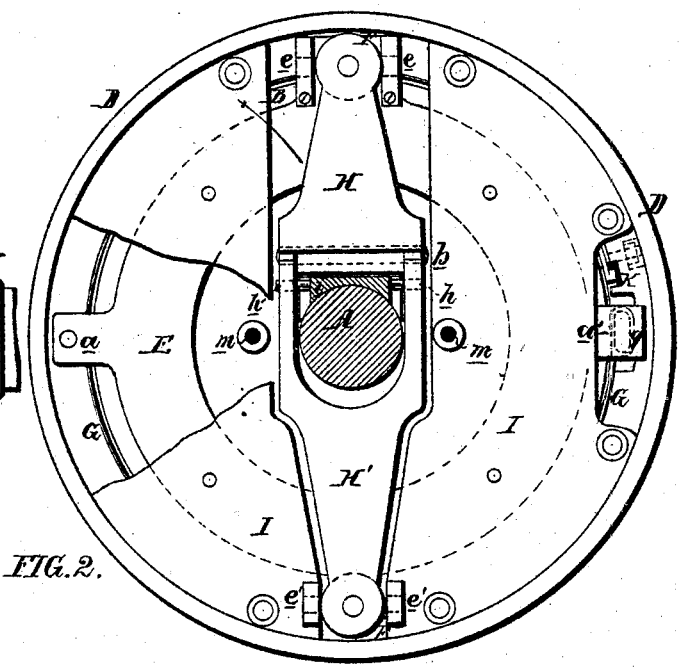

Be it known that I, THOMAS A. WESTON, of Ridgewood, Bergen county, New Jersey, have invented a Brake-Clutch for Hoisting Apparatus, &c., of which the following is a specification:

The object of my invention is to clutch a pulley, wheel, or other driver to and release it from a shaft; and this object I attain by the combination of a friction-wheel, B, on a shaft, A, a loose pulley, D, on the same shaft, a friction-band, G, a lever, E, and certain knee-joint arms, all as shown in the side view, Figure 1, which is partly in section, and in the face view, Fig. 2, part of which is removed to exhibit the interior.

To a driving-shaft, A, is secured a friction-wheel, B, contained within a pulley, D, which can be clutched to or released from the shaft by the mechanism which I will now proceed to describe.

E is a lever, consisting in the present instance of a flat annular plate, and has its fulcrum on a pin, $a$, projecting from the rim of the pulley D, the projection $a'$ of the lever directly opposite the fulcrum being connected to one end of the friction-band G, which surrounds the friction-wheel B, and the other end of which is connected to the rim of the pulley D, in a manner described hereafter.

Knee-joint arms H and H' are connected together by a pin, $b$, the former arm being jointed by a pin, $d$, to a block, F, trunnions on which are adapted to bearings $e\ e$ on the annular lever E, the other arm H' being jointed to a block, F', having trunnions adapted to bearings $e'\ e'$ on plates I I, which are secured to the rim of the pulley D, and serve to maintain the annular lever in its place.

When the knee-joint arms are in the position shown in Fig. 1 the friction-band is expanded and free from contact with the periphery of the wheel B; but when the knee-joint arms are moved inward in the direction of the arrow, Fig. 1, the annular lever E will be moved on its fulcrum-pin in the direction of the arrow, Fig. 2, the result of which movement will be the contraction of the band, its application to the periphery of the wheel B, and the consequent clutching of the pulley D to the shaft A.

It will be understood that a cog-wheel or other driver may be substituted for the pulley D, and that, instead of the shaft A being power driven, power may be so applied to the pulley D, or its equivalent, that the shaft may be clutched or released from the driver in the manner described.

The knee-joint arms may be controlled by different devices; but I prefer to control them by a lever through the medium of a sleeve, J, arranged to slide on the shaft, the flange $f$ of the sleeve bearing against an elevation on the arm H' when the latter is forced inward, and both arms being drawn outward by pins $h\ h$ connected to the arm H', and arranged to slide in grooves in a projection, $i$, of the sleeve. Two pins, $m$, are secured to lugs on the sleeve, and these pins, sliding in holes in the plates I I, prevent the said sleeve from turning independently of the pulley D.

Figure 3:
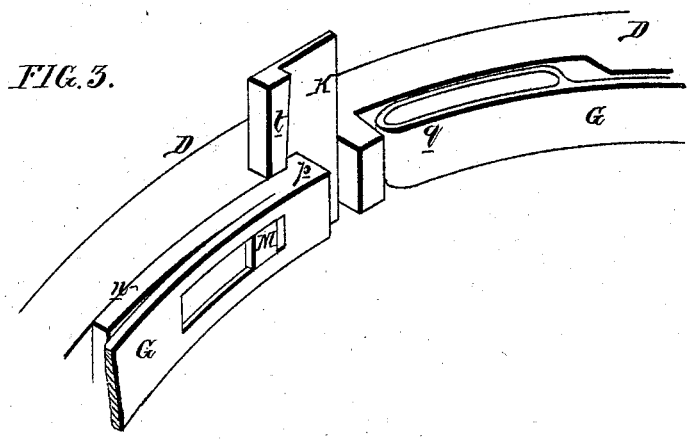

On one end of the friction-band G is forged an elongated eye, $q$, for receiving a projection on the annular lever E, as seen in the perspective view, Fig. 3, the inner edge of the rim of the pulley D being cut away to afford room for the limited play of the said eye $q$ of the friction-band when the latter is expanded and contracted.

The opposite end of the said band is secured to the rim of the pulley D in the following manner: A plate, $n$, is forged on the end of the band, and against a projection, $p$, on this plate bears the wedge-shaped rib $t$ on the key K, which is adapted to a transverse slot in the rim of the pulley D. A bolt, M, having a head sunk partly in the plate $n$, passes through an elongated slot in the latter and through the rim of the pulley D, which is recessed to receive the nut of the bolt. After loosening this nut the end of the friction-band may be adjusted nearer to or further from the opposite end $q$ by simply adjusting the key K.

I do not here claim the lever E as a medium through which the friction-band is expanded and contracted, as this lever forms the subject of a special claim in a separate application for a patent.

I claim as my invention—

1. The combination of a friction-wheel, B, on a shaft, a loose pulley, D, a friction-band, G, the lever E, and knee-joint arms arranged to operate the said lever, all substantially as described.

2. The end of the friction-band G and its projection $p$, in combination with the key K and its wedge-shaped rib $t$, the whole being adapted to the rim of the pulley D, substantially as set forth.

In testimony whereof I have signed my name to this specification in the presence of two subscribing witnesses.

THOS. A. WESTON.

Witnesses:
WM. A. STEEL,
HUBERT HOWSON.